Patented Feb. 26, 1946

2,395,587

UNITED STATES PATENT OFFICE 2,395,587

EGG PRODUCT

Everette C. Scott and Clinton H. Parsons, Chicago, Ill., assignors to Industrial Patents Corporation, Chicago, Ill., a corporation of Delaware No Drawing. Application April 17, 1943, Serial No. 483,463

7 Claims. (Cl. 99—113)

This invention relates to the treatment of egg material and the product of such treatment.

One of the objects of this invention is to provide a method of preserving egg material, such as egg yolks and mixed eggs. Another object of this invention is to provide a method of preserving egg material in such a manner that it may be readily reconstituted in the manufacture of food products. A further object of this invention is to provide a method of treating egg material to render the material particularly adapted for use in candy making, baking, and in the manufacture of ice cream. An additional object of the invention is to provide an improved modified egg material. Another object of the invention is to furnish a modified egg product having equivalent properties to normal liquid egg material, for example, when employed as an ingredient in the manufacture of ice cream mixes and bakery products. Other objects and advantages of our invention will become obvious from the ensuing description.

In accordance with this invention, normal liquid egg material, such as liquid egg yolks, or mixtures of egg whites and egg yolks, is modified by incorporation of a quantity of sugar and an ester of a polyhydric alcohol and a higher fatty acid, being characterized by having at least one alcoholic hydroxyl group in the polyhydric alcohol part of the ester. More particularly, this invention is directed to the manufacture of a balanced egg product which includes liquid egg material, a sufficient amount of sugar to preserve said egg material above freezing temperatures and an appropriate quantity of an ester of the above mentioned type to substantially restore the emulsifying properties of the resulting mixture of the equivalent of normal liquid egg material. The term "normal liquid egg material" is used to designate, and it is to be understood to include, normal liquid egg yolks, and normal liquid mixed eggs, that is, egg material containing both the egg whites and egg yolk.

It is generally recognized that egg yolks have a distinctive value as an improving agent for various food products, for example, bakery products, and particularly ice cream mixes. The egg yolk serves as an emulsifier and thereby improves the overrun, produces a drier ice cream, improves the flavor and texture of the ice cream and adds to the food value by virtue of its high protein and vitamin content.

The use of egg yolks as a constituent of food products, however, has presented certain difficulties which are due primarily to the perishable nature of the material; for example, egg yolks, per se, in order to be stored for any length of time must be frozen. Heretofore, it has been the practice for the wholesaler or egg packer to prepare and freeze the normal liquid egg material or egg yolk in order that it may be preserved until the time when it would be used. The frozen product is packaged in suitable containers and furnished the consumer, for example, an ice cream manufacturer, where it is usually stored under freezing temperatures until used. The product is then thawed and the liquid incorporated with the usual conventional dry ingredients in the manufacture of ice cream. This procedure has the disadvantage that when more egg yolks are thawed than required in the ice cream formula, they must be again frozen to avoid deterioration, stored and again thawed when used. As a consequence, alternating hydration and dehydration of the protein content takes place resulting in denaturization of the egg material. This is characterized by the separation of water resulting in dewatering of the egg materials and a decrease in solubility of the protein content. As a result the eggs are difficult to dissolve or disperse in the ice cream mix, depreciating their emulsifying value and adversely affecting the texture of the final product.

Furthermore, as a general rule, an ice cream manufacturer is governed in manufacturing his product by a formula involving a more or less fixed proportion of egg yolk to various other ingredients in the ice cream mix in order to obtain the proper texture, quality and degree of overrun in the finished material. If the emulsifying or bodying characteristics vary from the value established for a given quantity of egg yolk in calculating the ice cream formula, a corresponding depreciation in quality of the final product is evidenced. The result is a lack of uniformity in the product evolved from successive batches which is obviously undesirable from the manufacturer's standpoint. Since the ordinary ice cream manufacturer is not supplied with facilities for experimenting with each batch of egg yolk received from the packer, he must rely on successive batches having the standard qualities established for the specified amount of egg yolk material in the ice cream formula.

An effort has been made to improve the emulsifying value of egg materials and egg yolk, and to render egg yolks capable of being reconstituted after freezing by adding glycerides to them, with the addition of sugar for the purpose of flavoring, as disclosed in the Harris Patent No. 2,142,511, of January 3, 1939. However, in following the teaching of the Harris patent, where it is directed to store the eggs above freezing temperatures, an additional amount of the emulsifying ingredient must be employed together with certain compatible chemicals such as glycerine or ethyleneglycol. This would necessitate the inclusion of foreign materials, some being of questionable toxicity, having solely a preservative function and which do not otherwise enhance the flavor or other properties of the product. The resulting product does not have the inherent, beneficial properties which are comparable and equivalent to normal liquid egg material. In the present composition bactericidal activity is precluded by the absorbing action of the sugar which apparently dehydrates the germ cells by osmotic action. At the same time a useful function is served since less sugar may be employed in the ice cream formula.

A further proposal is found in the Fousek patent, No. 1,756,188, for preserving egg materials with substantial quantities of sugar. The result of such treatment, however, is a material depreciation in the emulsifying properties of the egg yolk, which in the case of an ice cream mix considerably reduces the overrun, necessitating the use of larger quantities of egg yolk to produce the desired results with an attendant disruption of ice cream formulas.

In accordance with this invention, a balanced egg product is produced which is the full equivalent of pure, normal liquid egg material, and which may be stored without freezing at normal refrigeration temperature until used. It is thus possible for the product to be formulated by the wholesaler and shipped in suitable receptacles or containers to an ice cream or bakery products manufacturer and stored at normal refrigerating temperature without the necessity of freezing and thawing with consequent deterioration in the properties of the material. An ice cream manufacturer is not ordinarily provided with equipment for storing frozen products for an indefinite period and by virtue of the present invention may store the liquid egg product for two or three months or longer until reused. The product retains the emulsifying value and freshness of the pure egg material and may be utilized in the ice cream mix in proportions calculated on the basis of normal liquid egg material without alteration of the formula. The aforementioned benefits are obtained in accordance with this invention by a mixture of liquid egg material, such as egg yolks, with a sufficient amount of sugar to preserve said mixture above freezing temperatures of the liquid egg material with the addition of a suitable amount of a fatty acid ester of a polyhydric alcohol characterized by having at least one free hydroxyl group in the polyhydric alcohol part of the ester to restore the emulsifying properties of the mixture to the equivalent of normal, pure liquid egg material. Although whole eggs including both yolks and whites may be employed in accordance with the invention, the balanced egg product is calculated on the basis of egg yolk content. The excess sugar employed in the formula also serves as a sweetening reagent in the ice cream formula or other recipes in which the egg product is utilized with a result that smaller quantities of sugar are required in the formula of the food product. The mixture of liquid egg material, sugar and an ester are heat treated and agitated to form an emulsion. Apparently the heat treatment vitalizes the mixture since the ice cream product exhibits an increased overrun over that obtained when the egg yolk-sugar mixture only are heated and the ester emulsifying agent subsequently added.

The esters of fatty acids and polyhydric alcohols having one or more free alcoholic hydroxyl groups on the polyhydric alcohol component of the ester are preferably edible esters, although inedible esters may in some cases be employed. Examples of satisfactory esters are monoacid esters of glycerol and higher fatty acids, diacid esters of glycerol and higher fatty acids, monoacid esters of ethylene glycol and higher fatty acids, monoacid esters of diethylene glycol and higher fatty acids, or any ester of a polyhydric alcohol and a higher fatty acid characterized by having one or more free alcoholic hydroxyl groups in the alcoholic component of the ester. Mixtures of monoacid esters and diacid esters of glycerol and higher fatty acids are also satisfactory. Specific examples of the esters which are satisfactory are the monoacid and diacid esters of glycerol and stearic acid and mixtures of the monoacid and diacid esters of glycerol and stearic acid. The term "higher fatty acid" is used in the claims to include those fatty acids found in such normal fats as butter, cocoanut oil, cottonseed oil, peanut oil, hog lard, beef fat, mutton fat, and other edible fats and oils. No claim, however, is made to the specific monoglyceride employed, and an emulsifying agent of the type disclosed in the above noted Harris patent is satisfactory for the purpose of the present invention.

In the manufacture of ice cream, the ice cream mix is made of liquid and dry ingredients. The liquid ingredients, such as cream, milk, unsweetened condensed skim milk, sweetened condensed skim milk, or condensed whole milk, are mixed in the desired proportions so that the final product will contain the required amount of fat, sugar, serum solids, and stabilizer. The dry ingredients, such as sugar, skim milk powder, whole milk powder, gelatin, or gums, are mixed with the liquid ingredients. The mix is then pasteurized, homogenized, aged, and frozen.

To insure a velvety texture and improve the body of the finished product it is often desirable to incorporate such agents as gelatin, egg yolk, or lecithin to cause the formation of finer ice crystals than would be formed in the absence of such agents.

Gelatin, egg yolk, and lecithin are useful to some extent in obtaining a velvety texture but it has been found difficult to control the amount of overrun and to obtain as much overrun as is necessary to secure the best texture in the final product. During the freezing process, air is incorporated into the mix and, as a result, the volume of the mix increases. The overrun is determined by comparing the weight of a fixed volume of the frozen ice cream to the weight of a fixed volume of the mix before freezing. During the freezing process, small portions of the ice cream are drawn into an overrun container and when the desired overrun is obtained, the ice cream is drawn from the freezer to be packed.

Gelatin is added to ice cream to give it a firm body of uniform texture, to prevent the formation of coarse ice crystals, and to increase the quality of ice cream as a food. Because of its colloidal nature, the gelatin acts as a stabilizer, the gelatin forming a tiny capsule about each small particle of the frozen mix, thereby preventing small particles from coming together to form larger particles and a consequent grainy or coarse product. It is known that egg yolk gives a smoothness to ice cream that can not be obtained by the use of gums or gelatin. It is also known that when egg yolk is added to the ice cream mix, the overrun may be obtained in a shorter time than it can be obtained with gelatin or gums alone. Egg yolk is not added as a substitute for a stabilizer, but is employed to obtain overrun more quickly and permit a higher overrun to be obtained with a reduction in power consumption. In accordance with the present invention, the overrun may be controlled and obtained in a shorter period of time, and the texture of the finished product may be greatly improved by the addition of the modified egg product of our invention, which consists essentially of egg yolk, sugar, and the esters of fatty acids and polyhydric alcohols having one or more free alcoholic hydroxyl groups in the alcoholic part of the ester.

We have found that a very satisfactory modified egg material may be prepared in accordance with the invention by mixing from 35 per cent to 60 per cent egg yolk with from 32 per cent to 52 per cent sugar and from 8 per cent to 13 per cent of the monoglyceride. In every case, and irrespective of the relative quantities of egg yolk and sugar employed in the composition, a sufficient proportion of monoglyceride is incorporated to substantially restore the emulsifying properties of the resulting mixture to the equivalent of pure egg yolk. The upper limit of the indicated range of egg yolk is determined by the minimum total solids which the composition may contain to maintain a preserving action in the mixture above freezing temperature. The lower limit of the egg yolk range is governed by the maximum amount of sugar which can be employed without rendering the mixture too viscous. We have discovered that a mixture containing less than 70 per cent total solids does not have satisfactory keeping qualities even when the maximum quantity of sugar is employed. Likewise, it has been found that a composition containing more than 82½ per cent total solids is not satisfactory since at this point the maximum viscosity is reached at which the product can be efficiently handled.

We have found that modified egg material prepared in accordance with the invention may be held at temperatures of from 40° F. to 50° F. for indefinite periods of time with no apparent deterioration or impairment of the qualities of fresh egg material. The keeping qualities of the product therefore render it exceedingly desirable for use by small consumers, for example, small ice cream manufacturers or bakers who may not have the required equipment for maintaining these materials at the lower freezing temperatures. In the use of improved egg product in the preparation of ice cream or bakery products, the composition is substituted for the equivalent amount of pure egg material in the recipe.

In preparing the modified egg material of our invention, the sugar is first added to the egg material and thoroughly mixed therein. The addition of the sugar to the egg material tends to cause liquefaction and the ester is then added and incorporated into the mixture of egg material and sugar. Alternatively, all three ingredients may simply be mixed together with agitation. The temperature of the resulting mixture is thereupon slowly raised from about 140° F. to about 150° F. or below the coagulation point. While heating, the materials are vigorously agitated to effect a complete emulsion and the product tends to become viscous. During agitation and heating, the temperature should not exceed 143° F. to about 145° F. and should be below the precipitation or coagulation point of the albumen. Since a small amount of the residual albumen adheres to the egg yolk in breaking of the egg yolks, agitation during the heating step must be employed to insure a smooth homogeneous mixture which is free from all lumps and specks, whereupon the product is slowly cooled.

We have found by using the heat treated product of the present invention an improved result is obtained which is not found to exist when the ingredients are added separately to the mixture of ice cream ingredients or bakery products. Apparently a physical or chemical reaction or coaction results from the agitation and heat treatment, the nature of which is not entirely known at the present time. Irrespective of the character of this reaction, it is known that an improved result is obtained by the combination of ingredients as set forth.

The following data clearly illustrates the improved results obtained in employing the balanced egg product of this invention:

Table No. 1

|  | 1 | 2 | 3 | 4 | 5 |
|---|---|---|---|---|---|
| Cream_____grams__ | 826.6 | 826.6 | 826.6 | 826.6 | 826.6 |
| Skim milk____do____ | 1,562.6 | 1,562.6 | 1,547.2 | 1,592.6 | 1,562.6 |
| Skim milk powder do____ | 151.8 | 151.8 | 153.2 | 148.4 | 151.8 |
| Sugar_____do____ | 420.0 | 420.0 | 420.0 | 420.0 | 420.0 |
| Gelatin_____do____ | 9.0 | 9.0 | 9.0 | 9.0 | 9.0 |
| 10% sugared yolk do____ |  |  |  |  | 30.0 |
| "Vrest"_____do____ | 3.0 |  |  | 3.0 |  |
| 40% sugared yolk do____ | 27.0 |  | 45.0 |  |  |
| 40% sugared yolk and 10% "Vrest" do____ |  | 30.0 |  |  |  |
| Overrun per cent__ | 96.0 | 101.0 | 80.0 | 86.7 | 85.2 |

It is noted in the case of formula 1 that a total of 30 grams of "Vrest" and 40 per cent sugared yolk were incorporated with the ice cream mix producing a resultant overrun of 96 per cent. In this case, however, the "Vrest" and sugared yolk were separately added to the formula. In formula 2, however, 30 grams of a heat treated mixture of 40 per cent sugared yolk and 10 per cent "Vrest" produced in accordance with this invention were incorporated in the ice cream mixture resulting in an overrun of 101 per cent. Formula 3 simply consisted of the conventional ice cream mix with 45 grams of a 40 per cent sugared yolk mixture producing an overrun of 80 per cent. In formula 4, 3 grams of "Vrest" alone were employed to give an overrun of 86.7 per cent, while in formula 5, 30 grams of a conventional 10 per cent sugared yolk mixture resulted in an overrun of 85.2 per cent. The ingredient designated as "Vrest" is a preparation consisting essentially of the monoglycerides of a blend of fatty acids, stearic acid being the predominating fatty acid.

In the preparation of the ice cream mixes set forth above, the dry ingredients, namely, the skim milk powder, sugar, and gelatin were triturated together. The liquid ingredients, namely, cream and skim milk, were mixed together. The sugared yolk, "Vrest," sugared yolk and "Vrest," or the sugared yolk containing "Vrest"

was first incorporated in a small amount of the liquid mix and this was then added and thoroughly incorporated in the balance of the liquid mix. The triturated dry materials were then slowly added to the liquid material in a pasteurizing vessel while constantly agitating the liquid materials. The mix was then pasteurized by heating to 160 degrees F. while continuing the agitation, after which the mix was held at this temperature for about thirty minutes. The pasteurized mix was then homogenized by passing through an orifice at approximately 2,500 pounds per square inch. The pasteurized and homogenized mix was then cooled to 40 degrees F. and held at this temperature over night. The mixes were then frozen during constant agitation.

The ingredient referred to as "10 per cent sugared yolk" refers to egg yolk which has been modified by the incorporation of ten per cent sugar. The ingredient referred to as "40 per cent sugared yolk" contains forty per cent sugar. The ingredient referred to as "40 per cent sugared yolk and 10 per cent 'Vrest'" designates a modified egg yolk prepared in accordance with the present invention, consisting essentially of fifty percent egg yolk, forty per cent sugar, and ten per cent "Vrest."

*Example I*

In preparing a modified egg yolk, a quantity of egg yolk was placed in a mechanical mixer and sugar gradually added during agitation, the sugar being added in the proportion of four parts of sugar to five parts of egg yolk. The temperature of the mixture was then raised to about 100 degrees F., and "Vrest" was melted and heated to about 100 degrees F. and then slowly added to the sugared yolks while constantly agitating the mixture. The amount of "Vrest" which is added to the sugared yolk was in the proportion of one part of "Vrest" to nine parts of sugared egg yolk. The final product consists essentially of fifty per cent egg yolk, forty per cent sugar, and ten per cent "Vrest." The resulting emulsion was then heated to a temperature of about 140 degrees F. while constantly agitating the mixture.

*Example II*

In preparing the modified egg yolk of the present invention, a quantity of egg yolk was placed in a mechanical mixer and sugar gradually added during agitation, the sugar being added in the proportion of 32 parts of sugar to 60 parts of freshly separated egg yolk. 8 parts of "Vrest" was thereupon added to the sugared yolks while constantly agitating the mixture. Heat was slowly applied using hot water as the heating medium. Heating progressed with constant agitation until a temperature of 150° F. was reached. The product was then gradually cooled using cold water or any other available cooling medium, such as ice water or brine, until the product reached a temperature of 85° F. to 90° F. This cooling procedure is not essential from the standpoint of the physical properties of the product, but it does reduce the temperature to a point below which thermophyls are active. When the product is held for a prolonged period of time this is merely further assurance of low bacteria content of the finished product.

The product is then delivered to suitable packing containers, such as tinned cans, or moisture proof paper cartons or cans, and is delivered to a freezing room where the product is frozen to a solid state.

*Example III*

50 parts of freshly broken egg yolks, 40 parts of corn, cane, or beet sugar, and 10 parts of "Vrest" were blended together and slowly heated under agitation to a temperature of 150° F. This product then gradually cooled to a temperature of 90° F., placed in suitable packages and delivered to a 32° temperature chilled room where the product gradually chilled to that temperature. This product was then removed to a 40° cooler and was held for a period of 21 months. Examination revealed slight mold on the top surface, but otherwise the product was sweet and sound.

As is apparent from the data, the overrun obtained by the use of the modified egg material of the present invention is considerably higher than the overrun which can be obtained by any of the other methods. The ice cream prepared in accordance with the present invention has a much finer texture than the product obtained by adding the esters and yolks independently or by adding only sugared yolks or "Vrest". The body of the ice cream prepared with the modified egg material was also superior to the body of the ice cream prepared in any other manner.

The modified liquid egg material which has been modified by the addition of sugar and an ester of a higher fatty acid and a polyhydric alcohol having one or more free alcoholic hydroxyl groups in the polyhydric alcohol component of the ester possesses similar improved properties with respect to the preparation of bakery products. In the preparation of bakery goods, the modified liquid egg product of our invention permits the preparation of baked goods having a marked and unexpected improvement in texture and in tenderness of the baked goods.

In preparing the balanced egg product of this invention, we prefer to employ from 35 per cent to 60 per cent egg yolk, from 32 per cent to 52 per cent sugar, and from 8 per cent to 13 per cent of the monoglyceride, the proportion of the monoglyceride to the other components being such as to produce a balanced product having the emulsifying value and equivalent properties to pure egg yolk. A series of egg yolk monoglyceride sugar mixtures was prepared of such composition that the egg yolk content varied in the final product from 35 per cent to 60 per cent. The monoglyceride content was proportionately increased so as to maintain a uniform emulsifying value in the finished product. Of necessity, the sugar content was proportionately reduced. The composition and moisture content of the six mixtures prepared is as follows:

|  | I | II | III | IV | V | VI |
|---|---|---|---|---|---|---|
|  | Parts by weight | Parts by weight | Parts by weight | Parts by weight | Parts by weight | Parts by weight |
| Egg yolk | 60 | 55 | 50 | 45 | 40 | 35 |
| Vrest (monoglyceride) | 8 | 9 | 10 | 11 | 12 | 13 |
| Sugar | 32 | 36 | 40 | 44 | 48 | 52 |
| Per cent total solids | 70 | 72½ | 75 | 77½ | 80 | 82½ |

We have found from experimental usage that monoglycerides have approximately five times the emulsifying value in ice cream mixes of egg yolks. In other words, $\tfrac{1}{5}$ per cent monoglyceride is as effective in producing air incorporation and firmness of body in the finished ice cream as is 1 per cent egg yolk. Further, we have found experimentally that by varying the increments of egg and monoglyceride proportionately, we have been able to maintain a uniform emulsifying value.

We have also discovered that a product of less than 70 per cent total solids does not have satisfactory keeping qualities even with high sugar content. In fact, a total solids content of 72½ per cent or more, giving a moisture content of 27½ per cent or less is preferred. We have found experimentally that it is not practical to prepare a combination product with greater than 82½ per cent total solids content inasmuch as at this point the product is reaching the maximum viscosity at which point it can be handled. While the full range of compositions listed above is considered as practical, from the standpoint of ease of handling, balance of flavor, and optimum keeping quality under adverse conditions we prefer a product having a moisture content between 20 per cent and 27½ per cent.

As to the heat treatment, we find that the maximum heat which may be applied is dependent upon the sugar concentration. We would consider a temperature range varying between 140° F. and 150° F. adequate for processing. All of the above given series was subjected to a pasteurizing temperature of 150° F. without coagulation. A temperature of 150° F. is about the maximum temperature that is safe for products of 40 per cent sugar content, but for products ranging up to 52 per cent sugar content, pasteurizing temperatures of 160° F. to 165° F. are apparently not harmful.

An outstanding advantage of the present product is apparent when it is considered that the ice cream manufacturer using egg yolks must choose between a fresh egg yolk, frozen egg yolk, or dried egg yolk. In using frozen eggs, the ice cream maker has found that during the freezing process the proteins have been considerably destabilized so that the task of dissolving eggs in the ice cream mix is a major one. In an attempt to overcome this lack of solubility it has become common practice to add 10 per cent sugar to the egg yolks at the time of freezing. However, using either the freshly broken yolks or the 10 per cent sugared yolks, the task of dispersing the eggs in the mix is not a simple one and involves detailed attention and vigorous stirring. It is the common practice to remove a small amount of the mix from the main batch, add the eggs to this small amount of mix, and stir vigorously with mechanical agitator or a hand-stirring device. A remarkable aspect of this invention is that solution of the product is easily effected even though frozen. The high sugar content protects the proteins from destabilization during the freezing period and renders the egg product easily dispersible throughout the mass of the mix. It can be added to the mix the same as any other ingredient, such as sugar, gelatin, or condensed milk, and will disperse readily with normal agitation within the vat.

Further, when the ice cream manufacturer uses 10 per cent sugared frozen eggs in his mix, he must allow eight to ten hours for the eggs to thaw. If eggs are not properly thawed, the result is usually "scrambled eggs." This results in an increased burden on the manufacturer. It is not always possible to anticipate the mix requirements a day in advance, so it may be necessary to keep extra eggs defrosted at all times. The bacteria count increases rapidly in eggs after defrosting, so high-bacteria count and sour eggs often result. Such eggs must be destroyed, or if used, result in a lowering of the quality of the finished ice cream. The egg product of this invention, standardized in accordance with the foregoing procedure, is always ready for use and is not subject to the above objections.

It is a matter of extreme importance to the ice cream manufacturer that the egg product of our invention can be shipped and held for two to three months time or, in fact, indefinitely without being frozen. In the manufacture of this product and storage of same, it may be frozen, the same as any frozen egg product. Unlike normal frozen eggs, however, it does not need to be maintained in a frozen condition during the time of shipment from the point of storage to the user. This makes possible the use of slower, unrefrigerated service, with a consequent monetary saving. After it is received by the user, he may keep it frozen if he elects to do so, but it can be held up two or three months without danger of souring or bacterial development in any refrigerated space available when a temperature of 45° F. or lower is maintained. This releases the expensive freezer space for other uses.

We claim:

1. As an article of manufacture, a balanced egg product substantially stable at normal refrigeration temperatures, comprising liquid egg material selected from the class consisting of egg yolk and a mixture of both egg white and egg yolk normally unstable at refrigeration temperatures, a sufficient amount of sugar to stabilize the egg material, said sugar causing a substantial decrease in the emulsifying properties of the mixture, and a sufficient amount of a partial ester of a fatty acid and a polyhydric alcohol to restore the emulsifying properties of said mixture to substantially that of an equivalent amount of said liquid egg material.

2. An egg product of about 20 per cent to 27½ per cent moisture content substantially stable at refrigeration temperatures above freezing and having substantially the emulsifying properties of straight egg yolk, which comprises egg yolk and sugar, the amount of sugar being sufficient to stabilize the egg yolk and to cause a substantial decrease in the effective emulsifying properties of the egg yolk in the mixture, and a sufficient amount of a partial ester of a fatty acid and a polyhydric alcohol to restore said emulsifying properties, the amount of the ester being about one-fifth of the amount of the sugar on a percentage basis.

3. As an article of manufacture, a balanced egg product substantially stable at normal refrigeration temperature comprising a mixture of liquid egg yolk, sugar and a partial ester of a higher fatty acid and a polyhydric alcohol, the egg yolk forming about 35 per cent to 60 per cent of the mixture, the balance being sugar and ester, the sugar being present in sufficient amount to preserve said mixture above freezing temperature causing a substantial decrease in the effective emulsifying properties of the egg yolk in the mixture and sufficient ester being present to restore the emulsifying properties of said mixture to substantially that of an equivalent amount of said liquid egg yolk.

4. An egg product of about 20 per cent to 27½ per cent moisture content substantially stable at normal refrigeration temperature, which comprises about 35 per cent to 60 per cent liquid egg yolk, about 32 per cent to 52 per cent sugar causing a substantial decrease in the effective emulsifying properties of the egg yolk in the mixture and a sufficient amount of a partial ester of a higher fatty acid and glycerine to substantially restore the emulsifying properties of said mixture to that of an equivalent amount of pure liquid egg yolk.

5. An egg product of about 20 per cent to 27½ per cent moisture content substantially stable at normal refrigeration temperature, which comprises about 35 per cent to 60 per cent liquid egg yolk, about 32 per cent to 52 per cent sugar, causing a substantial depreciation in the emulsifying properties of the egg yolk, about 8 per cent to 13 per cent of a partial ester of fatty acid and a polyhydric alcohol, said ester being present in sufficient amount to restore the emulsifying properties of said mixture to substantially that of an equivalent amount of said liquid egg yolk.

6. The method of manufacturing an improved modified egg product, which comprises mixing a sufficient quantity of sugar with liquid egg yolk to preserve the resulting mixture above freezing temperature whereby the emulsifying properties of the egg yolk are substantially reduced, incorporating a sufficient amount of a fatty acid ester of a polyhydric alcohol characterized by having at least one free alcoholic hydroxyl group in the polyhydric alcohol part of the ester to restore the emulsifying value of the mixture to substantially that of an equivalent amount of said liquid egg yolk.

7. The method of manufacturing an improved modified egg product, which comprises mixing a sufficient quantity of sugar with liquid egg material selected from the class consisting of egg yolk and a mixture of both egg white and egg yolk to preserve the resulting mixture above freezing temperature whereby the emulsifying value of the mixture is reduced, incorporating a sufficient amount of a fatty acid ester of a polyhydric alcohol characterized by having at least one free alcoholic hydroxyl group in the polyhydric alcohol part of the ester to restore the emulsifying value of the mixture to substantially that of an equivalent amount of said liquid egg material, and heating to a temperature of from 140° F. to 150° F. while agitating the mixture.

EVERETTE C. SCOTT.
CLINTON H. PARSONS.